Aug. 16, 1938.   O. FISCHER   2,127,251
TYPEWRITING MACHINE
Filed Oct. 8, 1932   6 Sheets-Sheet 1

Inventor
Oskar Fischer
by Frank Reichard
Attorney

Aug. 16, 1938.　　　O. FISCHER　　　2,127,251
TYPEWRITING MACHINE
Filed Oct. 8, 1932　　　6 Sheets-Sheet 2

Inventor
Oskar Fischer
by *[signature]*
Attorney Aug. 16, 1938.   O. FISCHER   2,127,251
TYPEWRITING MACHINE
Filed Oct. 8, 1932   6 Sheets-Sheet 3

Inventor:
Oskar Fischer
by
Franz Reichord
Attorney.

Aug. 16, 1938.　　　　O. FISCHER　　　2,127,251
TYPEWRITING MACHINE
Filed Oct. 8, 1932　　　6 Sheets-Sheet 6

INVENTOR
Oskar Fischer
by Christy and Wharton
his attorneys

Patented Aug. 16, 1938

2,127,251

UNITED STATES PATENT OFFICE 2,127,251

TYPEWRITING MACHINE

Oskar Fischer, Kappelhof, near Friedrichshafen, Germany

Application October 8, 1932, Serial No. 636,863
In Germany October 31, 1929

24 Claims. (Cl. 197—12)

My invention relates to improvements in typewriting machines, and more particularly in typewriting machines in which the types are disposed on a drum or cylinder adapted to be set with the types in printing position and to be thrown towards the platen by means of electromagnets. One of the movements to be imparted to the type cylinder for setting the desired type in printing position is a rotary movement, and for limiting the said rotary movement stops are provided which are adapted to be set into operative positions by key levers. It is important that in the gearings controlling the rotary movement of the type cylinder the number of the intermediate members should be reduced to a minimum, because such intermediate members tend to retard the rotary movement by their size and inertia, and because much power is needed for accelerating such intermediate members and for overcoming the frictional resistance. Further, such intermediate members are objectionable for the reason that the operation thereof causes much noise, and they render the gearing complicated. Further, the use of such intermediate members between the shaft or stem of the type cylinder and the stop members controlled by the key levers is objectionable because the elasticity and the unavoidable clearance in the joints cause inaccuracies in the position of the key-controlled stops, so that the types cannot be exactly set in printing position. In typewriting machines in which the type carrier takes the form of a segment such intermediate members can be readily avoided. The invention relates to typewriting machines in which the types are disposed all around the circumference of the type cylinder or on a considerable part thereof. If in machines of this type the stop member cooperating with the key-controlled stops is secured to the shaft or stem of the type carrier, the key-controlled stops must be disposed on a full circle or on a considerable part of a circle, which construction requires complicated mechanism. According to the invention the said stop member which is movable with the type cylinder takes the form of or is rigidly connected with a toothed sector meshing with a gear wheel connected with the type cylinder and having a larger radius than the said gear wheel, so that in the operation of the said parts the said stop member is rotated through a comparatively small angle, and the key-controlled stops are arranged on a broad flat arc, and they may be connected with the key levers by simple mechanism. This construction is particularly important where printing is effected by throwing the type cylinder towards the platen.

Another object of the improvements is to provide a machine in which the toothed sector, the stop member connected therewith, the armature or armatures of the electromagnets imparting rotary movement to the type cylinder, and other members connected with the type cylinder rotating and printing mechanism are secured to a common shaft which is rockingly mounted in stationary bearings.

Another object of the improvements is to provide electromagnets for imparting rotary movement, automatic shifting movement and printing movement to the type cylinder by means of rotary armatures, that is by means of armatures the pivot of which is located in the direction of the lines of force which pass from the magnetic poles to the armature when the said armature is in median position. In electromagnets of this type the air gap between the magnetic poles and the armature may be very small, and further, the electromagnets are particularly effective because at the beginning of the operation and when acceleration of the parts of the mechanism is necessary the magnetic force is at its maximum, while the said force is comparatively small at the end of the movement of the armature and when the power to be exerted thereby is small. As far as the electromagnet or electromagnets for imparting rotary movement to the type cylinder are concerned the improved construction is advantageous for the reason that the armature or armatures may be directly mounted on the shaft of the sector from which rotary movement is imparted to the shaft of the type cylinder.

Other objects of the invention will appear from the following description.

For the purpose of explaining the invention several examples embodying the same have been shown in the accompanying drawings, in which the same letters of reference have been used in all the views to indicate corresponding parts. In said drawings, Fig. 6 is a sectional elevation of the type cylinder and the top part of the stem or shaft carrying the same, Fig. 8 is an elevation viewed from the left in Fig. 7, Figs. 9 and 10 are respectively an elevation and a plan view showing the sleeve in which the type cylinder is mounted and parts of the mechanism controlling the throwing or printing operation thereof, Fig. 19 is a similar plan view showing a modification of the said mechanism, Fig. 20 is an elevation viewed from the left in Fig. 19, Fig. 21 is a sectional elevation on a larger scale showing a modification of the mechanism controlling the circuits of the electromagnets, Fig. 21c is a top plan view of Fig. 21a, Fig. 22 is an elevation showing the contact springs viewed from the left in Fig. 21.

Figures 6, 9:
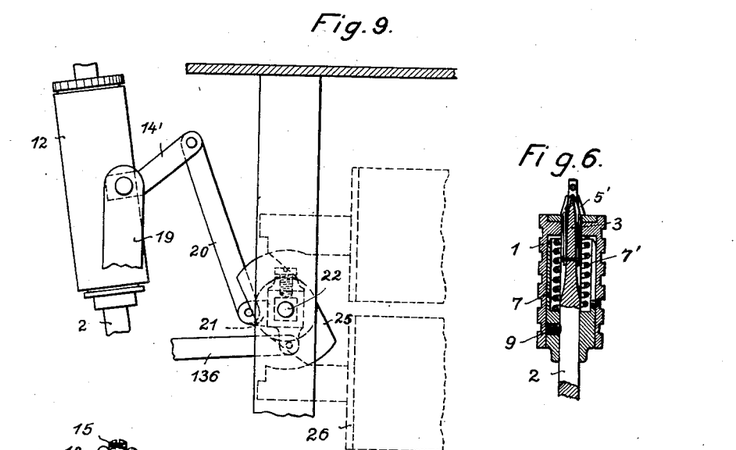
Figure 7:
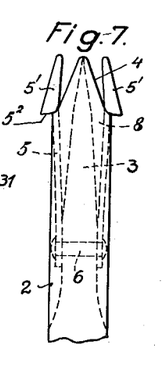
Fig. 7 is an elevation on a larger scale showing the top part of the stem or shaft of the type cylinder.
Figure 8:
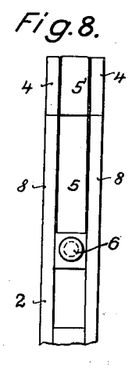

The type cylinder 1 is mounted on its stem 2 so that it may be readily removed therefrom. As is shown in Figs. 6 to 8, the said stem is formed at its top end and at opposite sides with two elongated recesses so as to provide a tapering portion 3, and the side walls 8 of the said median portion are likewise formed with tapering ends 4. To the top part of the stem two leaf springs 5 are secured to the stem by means of a rivet 6, which springs are located within the elongated recesses and guided therein and protected from injury. The springs 5 are formed with enlarged tapering top ends 5' providing shoulders $5^2$. To the stem 2 a cylindrical cup 7 is secured by means of a set screw 9, and the said cup is constructed for supporting the type cylinder 1, the said cylinder being held in position, against the action of a spring 7', by the shoulders $5^2$. If it is desired to remove the type cylinder from the said cup the springs 5, 5 are pressed inwardly so as to release the type cylinder, the top ends of the springs perfectly disappearing within the recesses.

Figures 1, 3, 4, 5, 13, 14, 15:
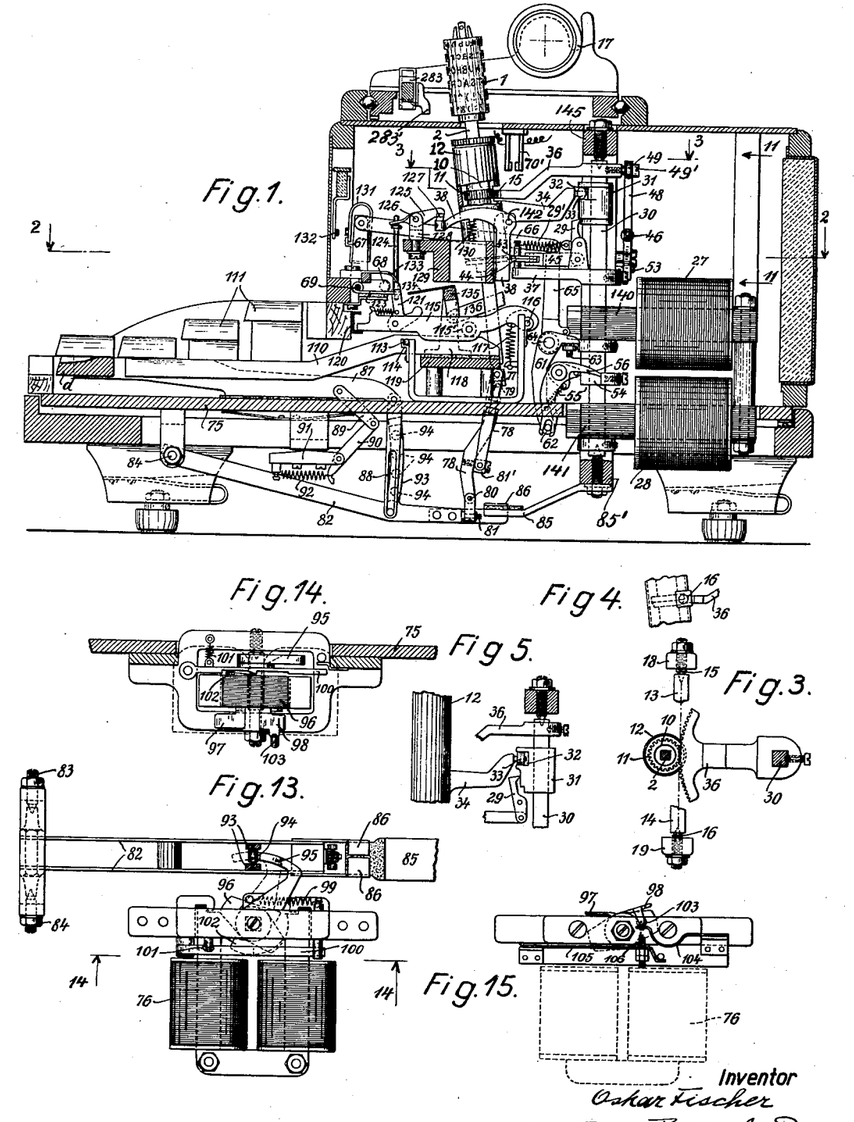
Fig. 1 is a sectional elevation showing the machine.
Fig. 3 is a plan view partly in section taken on the line 3—3 of Fig. 1, showing the manner of mounting the type cylinder and the toothed sector for imparting rotary movement thereto.
Fig. 4 is an elevation of a part of Fig. 3 showing the sleeve in which the type cylinder is rotatably mounted and a part of the toothed sector.
Fig. 5 is a detail elevation partly in section showing the sleeve in which the type cylinder is rotatably mounted and a part of the mechanism controlling the throwing or printing operation thereof.
Fig. 13 is a top plan view showing a part of the type cylinder shifting mechanism and the electromagnet connected therewith.
Fig. 14 is a sectional elevation taken on the line 14—14 of Fig. 13.
Fig. 15 is a bottom view of a part of Fig. 14.
Figure 10:
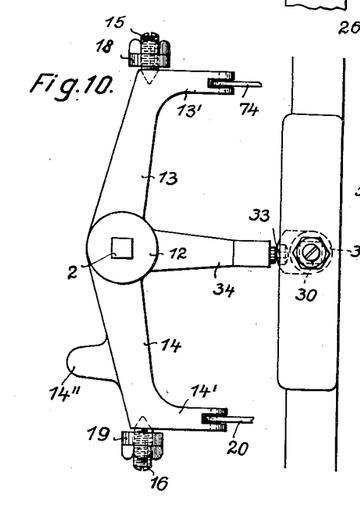

The stem 2 of the type cylinder is guided in a sleeve 10 carrying a gear wheel 11 (Figs. 1 to 5). It is polygonal or square in cross-section so that the cup 7 and the type cylinder 1 mounted thereon and the sleeve 10 may be readily mounted in correct positions relatively to one another. The sleeve 10 is mounted in a tubular member 12 made integral with laterally projecting arms 13 and 14 (Figs. 1, 9 and 10). The said tubular member and arms are rockingly mounted on pointed screws 15 and 16 screwing in arms 18 and 19, as is shown in Figs. 2, 3, 9 and 10. The arms 13 and 14 are made integral with rearward extensions 13' and 14', and the extension 14' is connected by a link 20 with an arm 21 secured to a rock shaft 22 mounted on pointed screws 23 and 24 and having the armature 25 of an electromagnet 26 secured thereto. When the electromagnet 26 is energized the armature 25 is rocked in a direction for throwing the type cylinder towards the platen.

The electromagnet 26 is connected in shunt with two electromagnets 27 and 28 provided for imparting rotary movement to the type cylinder for setting the desired type in printing position, and it is energized when one of the keys is depressed. However, normally the printing mechanism controlled by the electromagnet 26 is locked by the following mechanism: The tubular member 12 is cast integral with an arm 34 carrying a roller 33, and on a vertical rock shaft 30 a sleeve 31 is shiftable, which sleeve is formed at its front side with a circumferential groove 32 engaged by the roller 33 (Figs. 1, 5 and 10). Normally the said sleeve is held in elevated position by means of a latch 29 acted upon by a spring 29', and the said latch is thrown out of locking engagement with the sleeve 31 for permitting rocking movement of the arm 34 and the tubular member 12, shortly before the end of the rotary movement of the type cylinder. The mechanism provided for this purpose will presently be described.

By releasing the sleeve 31 from the latch 29 for permitting the type wheel to be thrown towards the platen before the end of the rotary movement of said type wheel rapid operation is insured. The throwing operation may be started before the end of the rotary movement, because at this moment the type cylinder and the armature of the electromagnet imparting rotary movement thereto are already in motion, while the throwing movement is gradually started by reason of the inertia of the throwing mechanism, and the last part of the rotary movement may be performed while the type cylinder moves towards the platen.

Figure 2:
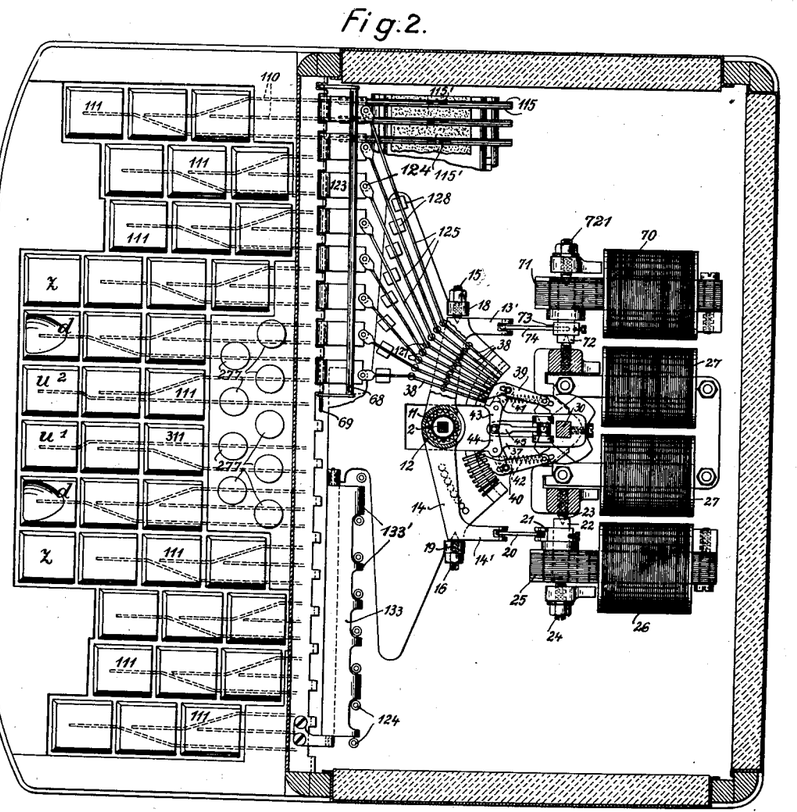
Fig. 2 is a plan view of the machine partly in section taken on the line 2—2 of Fig. 1.
Figure 18:
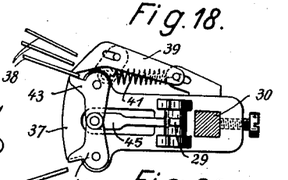
Fig. 18 is a plan view showing the mechanism for limiting the rotary movement of the type cylinder and the toothed sector cooperating therewith.

Rotary movement is imparted to the type cylinder by means of a toothed sector 36 which is in engagement with the gear wheel 11, and which is secured to the rock shaft 30 by means of a screw 49', the said sector being adapted to be rocked by the electromagnets 27 and 28 respectively to the right or left. The armatures 140 and 141 of the said electromagnets are secured to the stem 30, and they are angularly displaced relatively to each other so that one of the electromagnets turns the stem 30 to the right and the other one to the left. The upper electromagnet 27 is energized by depressing a key lever located at the right hand side of the machine, so that the armature 140 of the said electromagnet turns the shaft 30 in clockwise direction and the type cylinder 1 in anti-clockwise direction, and when a key of the left hand side of the keyboard is depressed the lower electromagnet 28 is energized, and the type cylinder 1 is rotated in clockwise direction. The rotary movement of the armatures of the electromagnets 27 and 28 is arrested by means of an arm 37 secured to the shaft 30 and impinging upon the downwardly directed arm of one of a set of bell crank levers 38, which arm has been rocked rearwardly by depressing a key connected therewith (Figs. 1, 2 and 18).

In the machine shown in the drawings means are provided for temporarily locking the arm 37 in its end positions and preventing the same from rebounding by elasticity. As is shown in Figs. 2 and 18, on laterally directed arms of the arm 37 two latches 39 and 40 are mounted which are shiftable forwardly and rearwardly relatively to the machine, the said latches being in pin and slot engagement with the arm 37, and being acted upon by coiled springs 41 and 42 tending to shift the same forwardly and in a direction towards the keyboard. The front ends of the said latches do not engage the downwardly directed arms of the bell crank levers 38 which have not been rocked, and they are adapted to yield to the downwardly directed arm of the bell crank lever 38 which has been rocked and to be shifted forwardly by the springs 41 or 42 and into position for engaging the outer face of the rocked bell crank lever as soon as the arm 37 impinges upon the inner face thereof. Thus the said rocked bell crank lever limits the rocking movement of the rock shaft 30, the sector 36 and the type wheel 1 by impinging upon the inner face of the rocked bell crank lever 38, and the latch 39 or 40 engaging the outer face thereof prevents return movement of the arm 37 and the parts associated therewith. At the end of the printing operation the bell crank lever 38 returns into initial position so as to release the latch 39 or 40 and to permit the arm 37 to return into initial position.

Figures 19, 20, 21, 21C, 22:
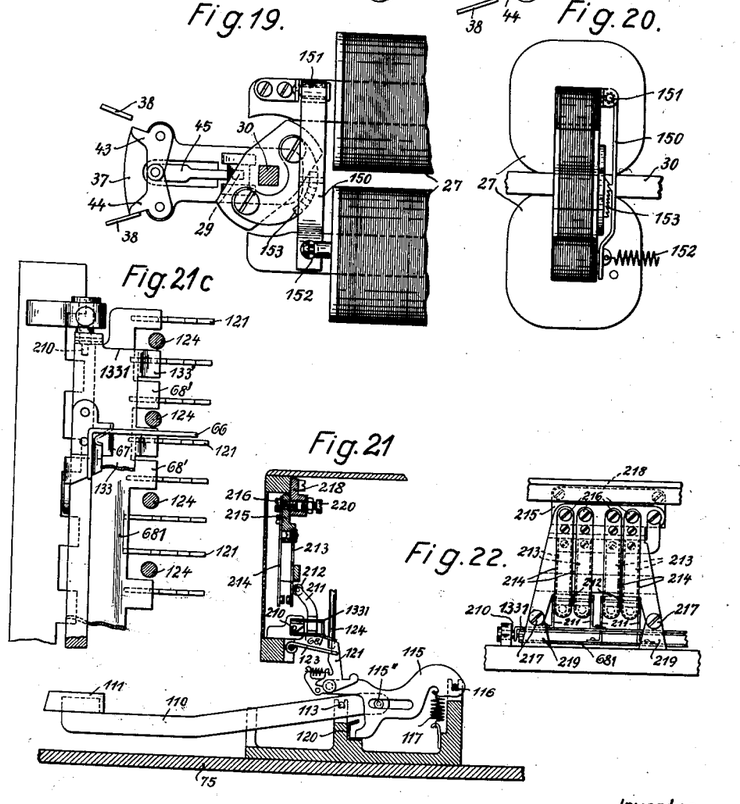

In the modification shown in Figs. 19 and 20 rebounding of the arm 37 is prevented by means of a spring latch 150 which is pivotally mounted at 151, and which is adapted to be rocked, by the magnetism of the energized electromagnet 27 or 28, into engagement with a toothed sector 153 secured to the armature of the said electromagnet. When the electromagnet is deenergized a spring 152 retracts the latch 150 so as to release the arm 37, and to permit the type cylinder to return into initial position.

The bell crank levers 38, 38 are rockingly mounted on a segmental axis 142, and their number is one half of that of the type keys 111.

The latch 29 is thrown out of locking engagement with the sleeve 31 by means of a link 45 connecting a downwardly directed arm of the latch with two latches 43 and 44 rockingly mounted on the arm 37 and formed with noses in position for impinging upon the downwardly directed arm of the rocked bell crank lever 38. The said noses slightly project beyond the arm 37, so that the latch 29 is rocked slightly before the end of the rotary movement of the type wheel (Figs. 1, 2, 18 and 19).

Thus, when the nose of one of the latches 43 or 44 impinges upon the downwardly directed arm of the rocked bell crank lever 38 the said latch is rocked and the rod 45 is shifted forwardly, thus retracting the pawl 29 away from the sleeve 31 and permitting the type cylinder to be thrown towards the platen. After the latch 43 or 44 has impinged upon the lever 38 the arm 37 engages the said lever and arrests the type cylinder in the position in which the selected type is in printing position.

Figures 11, 12:
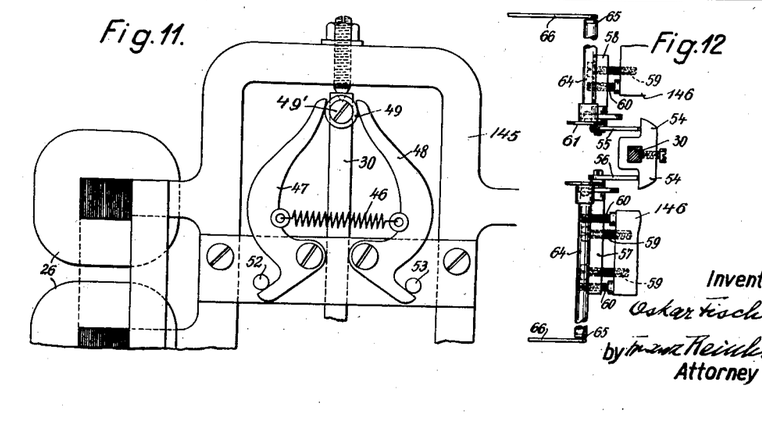
Fig. 11 is a detail elevation on a larger scale and viewed in the direction of the arrows 11, 11 shown in Fig. 1, for illustrating the mechanism for returning the type cylinder and the toothed sector for imparting rotary movement thereto into median position.
Fig. 12 is a plan view showing the mechanism for locking the type cylinder and the toothed sector in median position.

For returning the type cylinder 1 into median position mechanism is provided which is illustrated in Figs. 1 and 11. On the screw 49' fixed to the toothed sector 36 a roller 49 is mounted, which is straddled by two arms 47, 48 rockingly mounted on a frame member 145 and acted upon by a common spring 46 tending to hold the same in engagement with stop pins 52 and 53 and with the roller 49. Therefore, when the sector 36 is rocked in one or the other direction the roller 49 rocks one of the levers 47 or 48 outwardly, and when the rocked bell crank lever 38 has returned into initial position the spring 46 acting on the arm 47 or 48 returns the said arm and the sector 36 into median position in which the said arm bears again on the stop pin 52 or 53. By providing a single spring 46 for both levers 47 and 48 the construction is comparatively simple, and the resistance opposed by the spring to the rotary movement of the type cylinder to the right or left is always the same, and the power tending to return the type cylinder into initial position is the same whether the cylinder has been turned to the right or to the left.

Mechanism is provided for preventing the type cylinder and the parts associated therewith from being overthrown when they are returned into initial position by the spring 46, which mechanism is shown in Figs. 1 and 12. To the bottom part of the shaft 30 a stop member 54 having two laterally projecting arms is secured, which arms cooperate with two pawls 55 and 56 mounted on members 57 and 58 of square cross-section fixed by means of screws 59 and spacing screws 60 to frame members 146. By means of the screws 59 and 60 the pawls 55 and 56 are adjusted in positions. Normally the pawls 55 and 56 are held in position for locking the member 54 by springs 55'. When a key of the right hand part of the keyboard is depressed the right hand pawl 56 is rocked out of position for engagement with the stop member 54, so that the shaft 30 may be rocked clockwise. If thereafter the shaft is returned into initial position by the spring 46, the pawl 55 which has not been rocked is engaged by the member 54 and arrests the shaft 30 in median position, and immediately thereafter the pawl 56 is thrown into locking position relatively to the arm 54 cooperating therewith. Thereby rebounding of the mechanism is prevented. When a key of the left hand part of the keyboard is depressed the operation is similar. The pawls are adapted to be rocked out of locking position by means of bell crank levers 61 the downwardly directed arms of which are equipped with pins 62 engaging in slots of the downwardly directed arms of the pawls (Fig. 1). The horizontal arms of the bell crank levers 61 bear on adjustable stop members 63 controlling the engagement of the pawls 56 with the arms of the member 54. The bell crank levers 61 are secured to shafts 64 which have upwardly directed arms 65 secured to their outer ends, the said arms being connected by links 66 with arms 67. The arms 67 are secured to contact making bails 68 which are adapted to be rocked about an axis 69 when a key is depressed, and which are located one at each side of the machine. Fig. 2 shows only one of the said bails. Thus, when any one of the keys is depressed one of the pawls 55 or 56 is rocked out of locking position for permitting rotary movement of the type cylinder to the right or left.

Figure 21A:
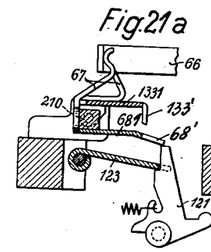
Fig. 21a is a detail sectional elevation on an enlarged scale showing a modification of the mechanism controlling the movement of the type cylinder, one of the controlling members being broken away.
Figure 21B:
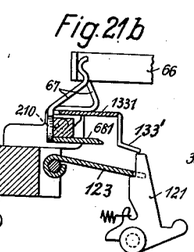
Fig. 21b is a similar elevation in which another one of the controlling members is broken away.

In the modification of the contact making mechanism shown in Figs. 21, 21a, b and c, each bail 68 and 133 carries an arm 67, which is adapted to rock one of the pawls 55 or 56 through the intermediary of one of the links 66, when a key is depressed. These figures will be described hereafter.

On the shaft 30 several members, viz. the arm 54, the armatures 140 and 141 of the electromagnets 27 and 28, the sleeve 31, the roller 49 and the toothed sector 36 are mounted, and all the said members must be in exact relative positions. For convenience in thus mounting the said members it is preferred to provide a shaft 30 having a square or polygonal cross-section.

For retracting the type cylinder from the platen a spring may be provided which is put under tension by the printing movement of the type cylinder. In the example shown in the figures and more particularly in Figs. 2, 9 and 10, an additional electromagnet 70 is provided for this purpose. The armature 71 of the electromagnet is fixed to a rock shaft 72 mounted on pointed screws 721, and an arm 73 fixed to the said shaft is connected by a link 74 with the extension 13' of the arm 13 of the tubular member 12. Slightly before the type cylinder strikes on the platen a switch 70' controlling the supply of energy to the electromagnet 70 is closed by the printing operation, whereupon the electromagnet rocks the type cylinder into initial position, and the electromagnet 70 is again deenergized.

Figures 28, 29, 30:
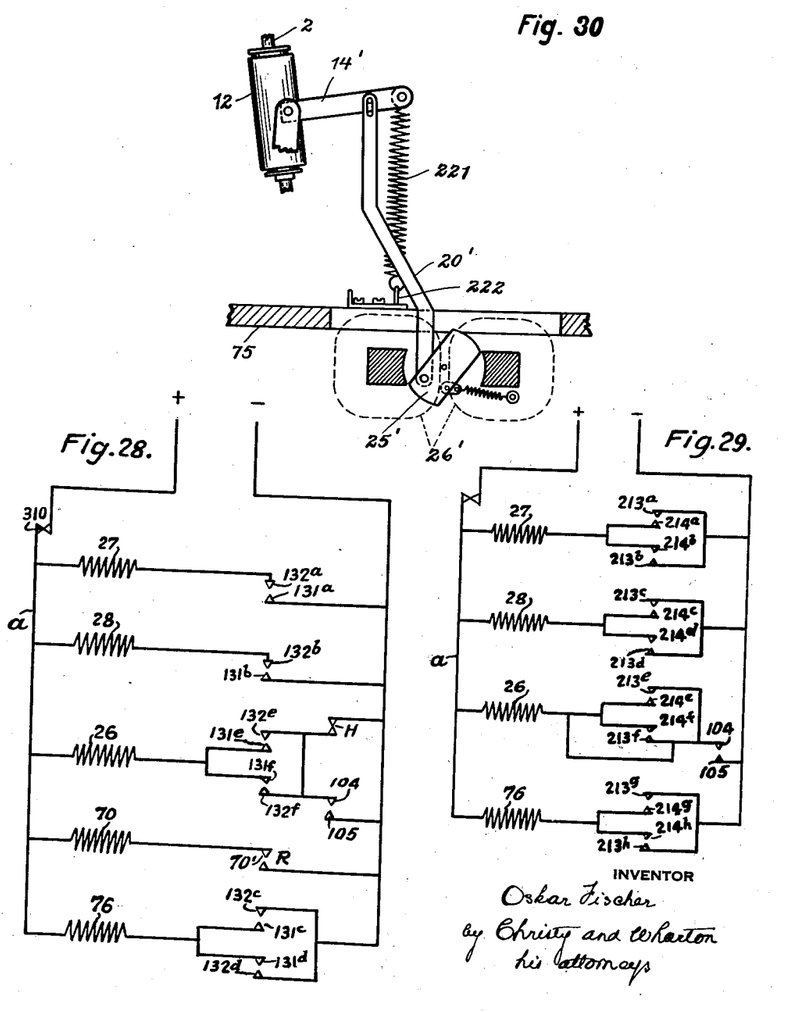
Figs. 28 and 29 are diagrams showing the electromagnets, switches and circuits operating the mechanisms of the machine.
Fig. 30 is a fragmentary view in vertical section illustrating an alternative detail of structure.

The construction may also be such that the type cylinder is thrown towards the platen by means of a spring, while the return movement is effected by means of an electromagnet, which also puts the spring under tension. This is illustrated in Fig. 30. To the extension 14' of the arm 14, projecting from the sleeve 12, a coiled spring 221 is attached, which spring is anchored at 222 in the base plate 75 of the machine. The tension of this spring is such that at all times it tends to swing the stem 2 in clockwise direction and to carry the type cylinder toward the platen. Electromagnet 26', being energized, effects rotation of its armature 25'. The rotation of the armature is effective through the link 20' to swing the shaft 2 against spring tension in counter-clockwise direction, as seen in Fig. 30, and so to carry the type cylinder away from the platen.

With reference to Fig. 19, it is manifest that the axis of the armature borne by the shaft 30 is so related to the electromagnet 27 that, when the electromagnet is energized, the armature-bearing shaft is turned counter-clockwise from its own median position (the position shown) toward a position in which the armature comes to its median position with respect to the electromagnet; that is to say, a position in which the axis of the armature extends in the direction of the lines of force passing from the poles of the magnet to the armature; and (cf. Figs. 1 and 2) it will be perceived that the same relationship obtains between the second armature borne by shaft 30 and the electromagnet 28 with which that second armature is associated. Reference to Fig. 9 will reveal the same relationship between the armature 25 that, mounted on the shaft 22, effects the printing rock of the type cylinder and its controlling electromagnet 26; and reference to Fig. 30 (illustrating an alternative arrangement) will reveal the same relationship between the armature 25' and the electromagnet 26'. And in all these cases the torque, that is effective either to rotate the type cylinder or to rock it, is a torque that diminshes in intensity as the type cylinder progresses in its movement. This characteristic is of value and utility both because maximum torque is exerted when inertia is to be overcome and maximum torque is needed; and further because in consequence the type cylinder, moving to successive positions under diminishing (though adequate) impulse, is brought to rest with diminished jar and sound of impact; and operation may be rendered relatively noiseless.

For compensating irregular current impulses an elastic member may be provided between the armature 25 and the arm 14'. For example the link 20 may take the form of a coiled spring. This modification is particularly useful where the machine is operated by alternating current.

As is shown in Fig. 1, the types are arranged on the type cylinder 1 in three pairs of rows, the uppermost pair of rows comprising for example the small letters, the second pair of rows the capitals, and the lowermost pair of rows the numbers and signs. The number of the keys is equal to the number of types of each pair of rows, and therefore when one half of the said keys is depressed the type cylinder must not only be turned about its axis, but it must also be shifted a distance corresponding to the distance between the rows of types of each pair. The shifting mechanism is illustrated in Figs. 1, 12, 14 and 15. It comprises an electromagnet 76 which is secured to the bottom side of the base plate 75 of the machine. In Fig. 1 the said electromagnet has not been illustrated.

In constructions heretofore proposed by me the said electromagnet was energized by each operation of a key, and also by the operation of a key by which the type cylinder was not shifted, in which case either the armature of the electromagnet was locked or disconnected from the shift mechanism. In my improved construction the shifting electromagnet is energized only when signs are to be printed which require shifting movement of the type cylinder, and the number of the necessary shifting operations is reduced to a minimum by disposing the types in the pairs of rows so that in any case the sign requires shifting of the type cylinder, which is printed comparatively seldom.

To the bottom end of the stem 2 of the type cylinder a cap 77 is secured, the cavity of which is engaged by the spherical head 79 of a rod 78 connected by a universal joint 80, 81 with a shifting lever 82 composed of two spaced blades and rockingly mounted between pointed screws 83, 84, as is best shown in Fig. 13. The free end of the said shifting lever is formed with two inwardly bent ears 86 normally bearing on an arm 85 having at its end a coating of felt and secured to a block 85' fixed to the bottom plate 75. For shifting the type wheel two keys $u^1$ and $u^2$ and key levers 87 are provided from which slotted links 88 are suspended, the shift key levers being adapted to lift the lever 82 and the type cylinder 1 to different heights for bringing either one of the lower pairs of rows of types into printing position. For limiting and exactly adjusting the shifting movement, and for returning the shift key levers into normal position toggle joints 89, 90 are provided, the links 89 of which are connected to the key levers 87, and the links 90 of which are connected to a block 91, springs 92 being provided for normally holding the toggle joints in the position shown in Fig. 1. When a shift key lever is depressed the toggle joint connected therewith is stretched. The plates forming the shift key lever 82 are formed with upwardly directed arc-shaped arms 93 providing supports for four rollers 94, and between pairs of the said rollers an arc-shaped cam member 95 may be passed for shifting the type cylinder and setting the same with the lower row of types in printing position. The said cam member 95 is secured to the square shaft of the armature 96 of the electromagnet 76. Two plates 97 and 98 fixed to the armature 96 are adapted to limit the movement of the cam member 95 to either side, and a spring 99 is provided for returning the armature 96 and the cam member 95 into initial position. For preventing rebounding of the cam member passed between a pair of rollers 94 a latch 100 is provided which is normally held out of engagement with a tooth 102 fixed to the armature 96 by means of a spring 101, and which is attracted by the poles of the electromagnet 76 when the said electromagnet is energized (Figs. 13 and 14). Thus, when the electromagnet is energized, and the latch is attracted, the armature 96 is rocked, and its tooth 102 slides in contact with the latch, until the armature arrives in its end position, whereupon a nose formed on the latch 100 engages at the rear of the tooth 102. When afterwards the electromagnet is deenergized for permitting the type cylinder 1 to return into initial position the latch 100 is retracted by the spring 101 with its nose away from the tooth 102, whereupon the armature 96 is free to return into initial position.

On the stop plate 98 a roller 103 is mounted which upon operation of the shifting mechanism presses a contact spring 104 into engagement with a contact screw 106 secured to the spring 105.

The object of this contact making device 104, 106 is the following: The electromagnets for imparting rotary movement to the type cylinder and the electromagnet for throwing the type cylinder towards the platen for printing are connected in shunt. But the throwing mechanism is locked by means of the sleeve 31 and the latch 29 until the rotary movement of the type cylinder is nearly completed. The shifting movement of the type cylinder must be completed simultaneously with the rotary movement. If however the angle through which the type cylinder is rotated is small the shifting movement might not be completed simultaneously with the rotary movement, and it may happen that the throwing movement begins before the proper time. This objection may be obviated by slightly retarding the throwing electromagnet, for example by means of a suitable energizing coil. In the construction shown in the figures the throwing electromagnet is not energized simultaneously with the shifting electromagnet when the type cylinder is to be shifted, and the circuit of the throwing electromagnet is closed only by the movement of the armature of the electromagnet operating the automatic shifting mechanism. For this purpose the said contact making device 104, 106 is provided.

Normally the type cylinder is in the position shown in Fig. 1 in which the upper row of the uppermost pair of rows of types is in printing position. For setting the second or third pair of rows into printing position the type cylinder is lifted by means of one of the shift key levers 87 and links 88, one of the said shift key levers being adapted to shift the type cylinder 1 through a distance equal to the distance between corresponding rows of the first and second pair of rows of types, and the other through a distance corresponding to the distance between corresponding rows of the uppermost and the lowermost pairs of the rows of types. If a type of the lower rows of the pairs is to be printed additional shifting movement is imparted to the type cylinder by means of the cam 95 rocked by the electromagnet 76 between pairs of rollers 94.

Figures 23, 23A, 26, 27:
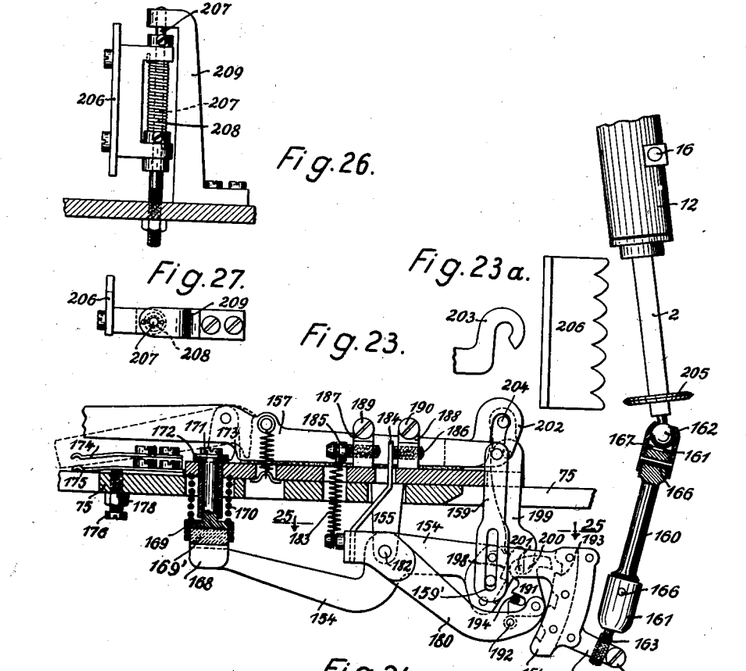
Fig. 23 is a sectional elevation on a larger scale showing a modification of the type cylinder shifting mechanism.
Fig. 23a is a detail view showing the end of one of the key levers shown in Fig. 23.
Figs. 26 and 27 are respectively an elevation and a plan view of the mechanism for exactly setting the type cylinder in shifted positions.
Figure 24:
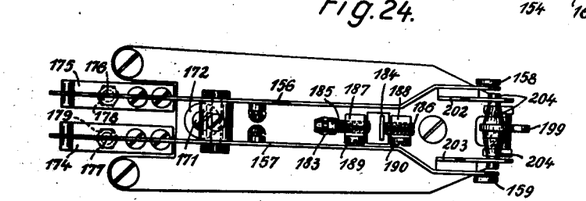
Fig. 24 is a top plan view of Fig. 23.

Figs. 23, 23a, 24 and 25 show a modification of the shifting mechanism. The said mechanism comprises a shifting lever 154 which is rockingly mounted on brackets 155, and which is adapted to be operated by means of shift key levers 156 and 157 through the intermediary of slotted links 158, 159. As is shown in Fig. 23 at 159', the said links have a slight lost motion relatively to the lever 154, the object of which will be explained hereafter. The shifting lever 154 is connected with the stem 2 of the type cylinder by means of a rod 160 which is provided at both ends with caps 161 embracing spherical heads 162 provided respectively at the bottom end of the stem 2 and a screw-threaded pin 163 fixed to an arm 164 of the lever 154. By means of the said screw-threaded pin 163 the rows of the type cylinder are set vertically in exact positions relatively to the platen 17. The arm 164 is slotted and the parts thereof are adapted to be clamped together for fixing the pin 163 in set position by means of a screw 165. The caps 161 are in screwing engagement with the rod 160, and by screwing the same more or less on the said rod the clearance of the spherical heads 162 may be reduced to a minimum. The caps are fixed in position by means of transverse pins 166. The heads 162 bear on polished disks 167 made from tempered steel. By reason of the construction of the rod 160 and the associated parts the mechanism may be readily adjusted, and it is adapted to yield in any direction, as is desirable for bringing the type cylinder and the shifting devices into correct relation to each other.

The shifting lever 154 is made from two blades which are connected at their front ends by a U-shaped member 168 normally bearing on a pad 169' fixed to the cup-shaped bottom end of a pin 169. The said pin is connected with the base plate 75 by means of an elongated thin member 170, which as shown takes the form of a coiled spring. To the top end of the pin a disk 172 is secured by means of a screw 171, which disk bears on a ring 173 of elastic material such as leather or rubber. The tension of the coiled spring 170 is such that it does not yield when the lever 154 impinges upon the pad 169. The object of the said elongated member or spring 170 is prevent the transmission of the noise from the pin 169 to the base plate 75.

The downward movement of the shift key levers 156, 157 is arrested in a noiseless way by thin rails or leaf-springs 174, 175 (Figs. 23 and 24) which are adapted to be adjusted in position by screws 176 and 177 and nuts 178 and 179.

Figure 25:
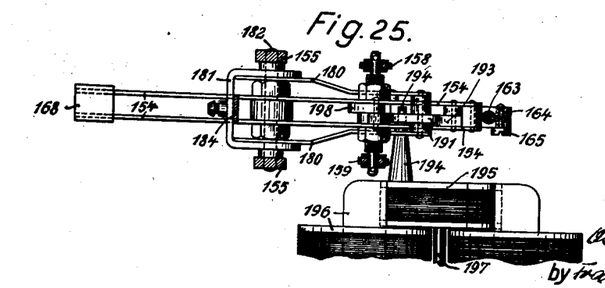
Fig. 25 is a top plan view partly in section taken on the line 25—25 of Fig. 23 and showing rockable levers, associate parts and electromagnets forming parts of the type cylinder shifting mechanism.

The automatic mechanism for shifting the type cylinder a distance corresponding to the distance between the rows of the pair of types comprises a bail 180 composed of two blades connected with each other by a U-shaped member 181. The key-operated shifting lever 154 and the automatically operated shifting lever 180 are rockingly mounted on a common axis 182. A tension spring 183 tends to pull the lever 180 downwardly. The upward and downward movements of the said lever are limited by a leaf spring 184 disposed between two stop screws 185 and 186, the strength of the leaf spring 184 being such that it does not appreciably yield when impinging upon one of the screws 185 or 186. The said screws are mounted in slotted brackets 187 and 188 (Figs. 23 and 22), and they are fixed in position by screws 189 and 190. At its free end the lever 180 carries a pawl 191 which is supported on a pin 192, and which is adapted for engagement with a notched member 193 fixed to and located between the blades of the lever 154. The said member 193 is formed with three notches corresponding respectively to the normal position of the type cylinder and to the positions to which it may have been shifted by the shift key levers 156 and 157. A slot of the pawl 191 is engaged by a pin 194 secured to the armature 195 of a shifting electromagnet 196 (Fig. 25). When the said electromagnet is energized its armature is rocked about its fulcrum 197, the pin 194 is moved upwardly and first rocks the pawl 191 into engagement with the notch 193 located in front thereof, and thereafter it shifts the stem of the type cylinder together with the levers 154 and 180 a distance corresponding to the distance between the rows of types of the pairs. The upward movement of the type cylinder is limited in a noiseless way by the spring 184. The spring 183 prevents the lever 180 from being shifted before the pawl 191 has been rocked into engagement with one of the notches 193.

To the blades of the key-controlled shifting lever 154 a second toothed member 198 is secured which cooperates with a pawl 199. By means of the toothed member 198 and the pawl 199 the key-controlled shifting lever 154 is prevented from being accidentally moved upwardly, and from being overthrown beyond the desired position by means of the shift key levers 156 and 157. A finger 200 formed on the pawl 199 normally bears on a pin 201 secured to the pawl 191. If the said pawl 191 is rocked to the right by the electromagnet 196 the pawl 199 is rocked to the right and out of position for engagement with the member 198, so that the automatic shifting mechanism may be operated by the electromagnet 196. When one of the shift key levers is depressed, the pawl 199 is rocked into inoperative position by hooks 202 and 203 provided at the ends of the shift key levers 156 and 157 and formed with cam faces acting on a pin 204 secured to the top end of the pawl 199. At the beginning of the shifting operation the pawl 199 is rocked to the right by the said cam faces and the pin 204. The links 158 and 159 have a slight lost motion relatively to the lever 154, as at 159', so that the pawl 199 is rocked by the levers 156 or 157 before the shifting movement begins. When the type cylinder is shifted with the third row of types into printing position the pawl 199 is released and rocked into locking position as soon as it has passed the first tooth of the member 198, because the said hook 203 is comparatively short (Fig. 23a), and when the type cylinder has been shifted with the fifth row of types into printing position, the pawl 199 is released only when the third tooth of the member 198 is in operative position, for which purpose the hook of the shift key lever is comparatively long. In both cases the pawl 199 is again released by the pin 201 of the pawl 191 when the automatic shifting mechanism is operated by the electromagnet 196.

To the bottom end of the stem of the type cylinder a disk 205 having a bevelled margin is secured, which is adapted to engage a toothed member 206 when the type cylinder is thrown towards the platen, whereby inaccuracies in the position of the type cylinder are corrected. The toothed member 206 is rockingly mounted on a pivot bolt 207 supported by means of a bracket 209 (Figs. 26 and 27), and it is held in position by a coiled spring 208. When it is impinged upon by the disk 205 it slightly yields rearwardly. Therefore the type cylinder is set in the correct position vertically before the type impinges upon the paper, and, further, the operation is made almost noiseless. The pivot bolt 207 is screw-threaded at its bottom end, and at its top end it is axially shiftable in the bracket 209. Thus the member 206 may be readily set in the correct position vertically.

The keyboard of the machine is shown in Figs. 1 and 2. The keys are arranged in a manner heretofore proposed by me, and so that the shape of the keyboard corresponds to the form of the hands, the fingers placed on the keyboard being bounded at all sides by the keys of the upper series which are located at a higher level. Thus the keyboard is particularly suitable for blind-writing by means of all the fingers of both hands. In the improved machine this keyboard is combined with a construction in which the key levers act on pawls or the like which are automatically released at the end of the printing operation, so that it is not necessary to release a depressed key before the next one is depressed, and the hands of the writer may bear on the depressed keys and the keys may be depressed in immediate succession. The result of this combination is an important improvement of the machine, in so far as the machine has a function similar to a machine constructed for printing syllables, because, when properly distributing the letters on the keyboard, frequently several letters may be printed by a single finger operation, the finger sliding from a depressed key to a key or keys located below the same in the next row of keys. The construction of the said pawls acted upon by the key levers and the means operated at the end of the printing operation will be described hereinafter.

In the improved machine two space keys z are provided, and the said space keys are disposed at the side or in front of the thumb keys d, so that they may be operated without shifting the hands by merely shifting the thumb to the side or forwardly, and the attendant may depress either the left hand or right hand space key.

It has heretofore been suggested to arrange the letters on the keyboard in a novel manner. However, heretofore it was not possible to rearrange the letters of the keyboard, because the clerks are accustomed to the arrangement now in use, and it would be necessary for them to learn writing with rearranged letters. In the improved keyboard this difficulty is obviated by having the keys as well as the type cylinder readily exchangeable. Therefore young students who are not yet accustomed to the present distribution of the letters on the keyboard, and also such clerks who do not object to the trouble of learning the new keyboard, are enabled to exchange the keys so that they are arranged according to the new principle, and at the same time to place a new type cylinder on the machine.

Figure 16:
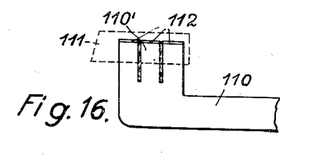
Fig. 16 is an elevation on an enlarged scale showing the end of a key lever.
Figure 17:
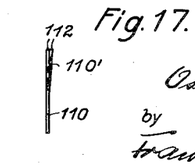
Fig. 17 is an elevation viewed from the left in Fig. 16.

Figs. 16 and 17 show the manner of mounting the keys on the key levers. The key levers 110 are punched so as to produce a tongue 110' which is bent slightly to one side and which therefore acts as a spring when the keys 111 which are provided at their bottom sides with a slot are placed thereon. By providing the upper portions of the key levers with bevelled edges 112 and the margins of the slots with similar bevelled portions the keys can be readily placed on the key levers.

The keys of the successive rows are not displaced relatively to one another in lateral direction, but they are disposed along straight lines one behind the other and in columns. For this reason the key levers of the two lower rows are cranked respectively to the right and left, as is shown in Fig. 2. All the type key levers 110 have a common axis 113 (Figs. 1 and 21), which is supported on arms 114. Above each type key lever there is an intermediate lever 115 composed of two blades, and the said key levers engage with their upper margins between the said blades, so that the key levers and intermediate levers guide each other. Also the intermediate levers have a common axis 116. Between the blades of the intermediate levers 115 there are disks 115' which bear on the inner ends of the key levers. To the intermediate levers springs 117 are attached which normally pull the said levers downwardly, so that the key levers bear with their inner or rear ends 118 on a base 119 carrying cushions of felt or leather. The key levers are different in length, and it is desirable that the movements of the intermediate levers and the downward strokes of the keys be alike. In the construction shown in the figures this is accomplished by dividing the inner ends of the key levers and the lengths of the intermediate levers taken from the axis thereof to the disks 115' so that the difference in the lengths of the key levers is compensated. For exactly limiting the vertical movements of the key levers and the intermediate levers a U-shaped rail 120 is provided.

In the modification shown in Fig. 21 the key levers 110 act on intermediate levers 115 rockingly mounted at 116, the levers 115 being provided with slots engaged by pins 115' fixed to the key levers. The base 119 may be dispensed with.

Near their free ends the intermediate levers 115 carry pawls 121, and pairs of adjacent levers act through their pawls each on one of a plurality of contact plates 123 adapted to shift rods 124 connected with the front ends of levers 125 for rocking the same about their axes 126. As is shown in Fig. 2, two of the key levers 110 of the left hand row act on the same plate 123, and the third key lever of the said row and one of the key levers of the second row act on the second plate 123, while the other key levers of the second row act on the third plate 123. The rear ends of the levers 125 engage in slots of pins 127 mounted in eyes formed on the bell crank levers 38, the said pins 127 being held in their eyes by friction and being adapted to be adjusted therein circumferentially and vertically. The levers 125 are mounted in slots of studs 128 which are fixed to a frame member 129 so that they may be turned about their vertical axes for adjusting the same in their proper positions. After printing, the bell crank levers 38 and the parts associated therewith are returned into initial position by springs 130.

By reason of the dimensions of the levers described with reference to Figs. 1 and 2 all the keys have the same stroke, and equal movements are imparted thereby to all the pawls 121, bell crank levers 38, contact springs, etc., though all the parts are arranged according to what is most convenient in writing, and the key levers which are different in length are mounted on the same axis. Further, the key levers which are parallel to one another, and which are disposed one beside the other, act on radial bell crank levers 38, and yet there is no wedging in the gears, and the parts do not require excessive accuracy in mounting which might interfere with the assemblage of the machine.

Above the contact plates 123 the two aforesaid bails 68 are located one at each side of the machine (Figs. 1 and 2). The said bails are elevated by any one of the contact plates 123 connected with a depressed key lever. Thereby the circuit of one of the electromagnets 27 or 28 for imparting rotary movement to the type cylinder in one or the other direction, and the circuit of the throwing electromagnet 26 are closed by means of U-shaped contact springs 131 and cooperating contacts 132. Two further bails 133 are shaped so that they are moved by one only of a pair of adjacent pawls 121, which bails are adapted to close the circuit of the shifting electromagnet 76. As is shown in Fig. 2, the bails 133 are formed at their rear sides with projections 133' engaged by some of the pawls 121, while the other pawls are located with their top ends in the recesses provided between the said projections.

In the machine shown in the figures the types are so distributed on the type cylinder that out of two signs which are brought into printing position by turning the type cylinder through the same angle, the sign which is more frequently used is located in the upper row of the pair of rows of types on the type cylinder, so that it is printed without actuating the shift mechanism, and the said shift mechanism is used only occasionally.

Figs. 21, 21a, b, c and 22 show a modification of the contact making mechanism, in which the plates 123 have only the function of imparting movement to the levers 125 and 38 through the intermediary of the rods 124. For closing the contacts, at the right hand and left hand sides of the machine two bails 681 and 1331 are provided, which are located one above the other, and the said bails are formed with recesses and projections 68' and 133', the projections of one bail being located within the recesses of the other one, as is shown in Fig. 21c. The said bails bear with their projections on the top ends of the pawls 121, and they are adapted to be moved by the said pawls independently of each other. The bails are rockingly mounted on a common axis 210. The projections 68' of the lower bail 681 bear on the pawls 121 of the keys which operate without causing automatic shifting movement of the type cylinder, and which therefore close only the circuits of the rotating and printing electromagnets, while the projections 133' of the upper bail 1331 bear on the pawls 121 connected with the keys requiring shifting movement of the type cylinder. The last-named keys close the circuits of the electromagnets for imparting rotary and shifting movement to the type cylinder, and the said shifting electromagnet closes the circuit of the throwing electromagnet when it is operated, while the first-named keys close only the circuits of the rotating and printing electromagnets. The circuits are closed by means of arms 211 carrying rollers 212 of insulating material and provided one on each ball 681 and 1331, the said arms 211 and rollers 212 pressing two contact making springs 213 into engagement with two contact making springs 214 when a key is depressed. As is shown in Fig. 22 the contact arms 211 and their rollers 212 act each on a pair of contact making springs 213. The contact making springs of one pair are adapted to close the circuits of the rotating and printing electromagnets, while the contact making springs of the other pair close the circuits of the rotating and shifting electromagnets. Thus, by each key two contacts are operated, and therefore all the keys require the same power. In this respect the construction shown in Figs. 21 to 21c is preferable as compared to the construction shown in Fig. 1, in which some of the keys operate two contacts, and other keys operate three contacts. The circuit of the printing electromagnet is closed by means of the shifting electromagnet through the intermediary of a subsidiary switch connected in shunt with the main switch of the circuit of the printing electromagnet and located in position for being closed by the shifting electromagnet.

The two pairs of contact making springs provided one at each side of the machine are mounted on a block 215 secured by means of screws 216 to an insulating block 218 and by means of screws 217 to two brackets 219. By the screws 216 all the contact springs are connected with their leads, the screw-threaded bushings of the screws 216 providing the nuts of the clamping screws 220. Thus all the contact making springs may be readily exchanged by unscrewing the screws 216 and 217, without loosening the leads.

Above the tail ends of the pawls 121 respectively of the right hand and left hand sides of the machine two bails 134 are located which are rockingly mounted on an axis 135, and which are connected by links 136 with the armature 25 of the printing electromagnet 26 (Figs. 1 and 9). The said bails are rocked downwardly slightly before the type on the type cylinder impinges upon the paper, and they throw the pawl 121 which has been operated by the key out of operation, so that the parts moved through the intermediary of the said pawl are returned into normal positions, and the contacts controlled thereby are interrupted, though the key remains in depressed position.

The mechanism for closing the electric circuits comprising the pawls 121 and the contact making bails 68 and 133 is advantageous for the reason that the interruption of the electric circuits is in-dependent as to time of the return movement of the parts 123, 124, 125 and 38 used for setting the type cylinder into printing position. For this purpose the length of the arms of the pawls 121 taken from the fulcrum to the surface of the plate 123 and to the points where the contact making bails 68 and 133 engage the said pawls may be made different in length, or the contact making bails may be made longer or shorter, so that they are released by the pawls at the proper moment. To have the circuit breaking operation independent of the circuit closing operation is important for the reason that in view of the rapidity of the operation of the machine the electric circuit should be interrupted as early as possible, in order to permit the type cylinder to return into inoperative position after printing, while the bell crank lever 38 must remain in advanced position until the type cylinder has begun its rotary return movement, which rotary return movement cannot be immediately started when the circuit is interrupted, by reason of the acceleration during the forward movement.

Further, the mechanism for interrupting the electric circuit permits printing with greater or smaller force, according to the number of the copies to be made, for which purpose the bail 134 is made to act earlier or later on the pawls 121 for interrupting the current at an earlier or later moment, so that the impression is made more or less strong.

The current interruption may also be regulated in such a way that letters of larger surface, such for example as the letters "W" and "M", are printed with greater force than others, such for example as points and commas, which when printed with high force perforate the paper. For this purpose the bail 134 is shaped so that it engages the corresponding pawl 121 at an earlier moment in case of small signs, while it engages the same at a later moment in case of large characters. In a modification the dimensions of the pawls 121 are varied in such a way that the horizontal arms thereof are higher or lower.

In Fig. 28 I have shown a diagram illustrating the electromagnets, switches and circuits of the mechanisms of the typewriting machine shown in Figs. 1 and 2. The electromagnets 26, 27, 28, 70 and 76 are connected in shunt to a lead $a$ connected through the switch 310 with a source of electric energy represented in the figure by the plus (+) and minus (—) signs. When a key of the right hand or left hand side of the machine is depressed which is disconnected from the shift mechanism, the corresponding switch 131a, 132a (131b, 132b) of the right hand or left hand side of the machine is closed. Thereby the electromagnet 27 or 28 for imparting rotary movement and the printing electromagnet are energized and they operate the mechanisms controlled thereby in the manner described above.

If a key is depressed which controls the shift mechanism, in addition to the switch 131c, 132c (131d, 132d) for the shifting electromagnet 76, the switch 131e, 132e (131f, 132f) is closed, and simultaneously a switch H of the printing electromagnet 26 is opened. Slightly before the end of the movement of the shifting electromagnet 76 the switch 104, 105 of the printing electromagnet 26 is closed, by the shifting electromagnet 76, and now the printing electromagnet is energized. Before the type cylinder strikes on the platen the switch 70' of the electromagnet 70 is closed, and the said switch is opened again it the end of the return movement of the type cylinder.

The switch 310 is the main switch which is closed before the operation of the machine begins and the said switch is adapted to be automatically opened by the line stop.

In Fig. 29 I have shown the circuit of the modification shown in Figs. 21a, 21b, 21c and 22. When a key is depressed which does not operate the shift mechanism, the switch 213a, 214a (213b, 214b) or the switch 213c, 214c (213d, 214d) for the electromagnet 27 or 28 for imparting rotary movement and the switch 213e, 214e (213f, 214f) for the electromagnet 26 for imparting printing movement are closed, and the machine operates as has been described above. If a key is depressed which controls the shifting mechanism, the switch of the electromagnet 27 or 28 and the switch 213g, 214g (213h, 214h) of the shifting electromagnet 76 are closed, whereupon the rotating and shifting mechanisms are operated. The printing electromagnet 26 is energized by the shifting electromagnet which closes the switches 104, 105 slightly before the end of the movement. Thus by the depression of the key in both cases two switches are closed and therefore the resistance opposed to the finger depressing a key is always the same.

I claim:

1. In a typewriting machine, the combination, with a rotary type carrier, key-controlled mechanism for imparting rotary movement to said type carrier comprising a rock shaft, a pawl engaging said rock shaft and adapted to lock the same in median position, means operative when rotary movement is imparted to said type carrier and inoperative at the end of the return movement thereof for throwing said pawl out of locking engagement with said rock shaft.

2. In a typewriting machine, the combination, with a rotary type carrier, its shaft, and the mounting for said shaft which is rockable for imparting printing movement to said type carrier, of key-controlled mechanism for imparting rotary and printing movements to said type carrier comprising electromagnets for imparting respectively the rotary and the printing movement, means for simultaneously energizing said electromagnets, and means for preventing printing movement to a moment near the end of the rotary movement.

3. In a typewriting machine, the combination, with a rotary type carrier having a series of signs arranged thereon in two rows, of key-controlled mechanisms for imparting rotary and printing movements to said type carrier, an electromagnet and its armature for shifting said type carrier, shift mechanism, and a shift member adapted to be moved by said armature first into engagement with said shift mechanism and thereafter in a direction for shifting said type carrier.

4. In a typewriting machine, the combination, with a rotary type carrier, and its operating mechanism, of a type carrier shift mechanism, means for locking said shift mechanism in position as against shifting movement and means operative when said shift mechanism is operated for throwing said locking means into inoperative position.

5. In an electrical typewriting machine, the combination, with a rotary type carrier, the platen, and mechanisms including electromagnets and their circuits for imparting rotary, printing and shifting movements to said type carrier, of switches included in the circuits of said electromagnets, members one adapted to close the switches of the rotating and printing electromagnets and the other adapted to close the switches of the rotating and shifting electromagnets, and key levers one group adapted to operate one member and the other group adapted to operate the other member, said shift mechanism being constructed for closing the circuit of the printing electromagnet.

6. In an electrical typewriting machine, the combination, with a rotary type carrier, of mechanisms including electromagnets and their circuits for setting said type carrier with the desired type in printing position and for throwing the same towards the platen, switches included in the circuits of the said electromagnets, a bail controlling said switches, members controlling said mechanism for setting said type carrier in position, key-controlled pawls for operating said bail and members, and a device connected with said throwing mechanism for retracting said pawls from said bail and members, each of said pawls being formed with two shoulders one loosely engaging said bail and the other one loosely engaging one of said members.

7. In a typewriting machine, the combination, with a rotary type carrier, of mechanism for imparting rotary movement to said carrier comprising a gearing the driven member of which has a smaller radius than the driving member so that the angles through which the driving member is rotated are smaller than the corresponding angles through which the driven member is rotated, a stop connected with said driving member and located between the axes of said driving and driven members, and a series of key-controlled stops cooperating with said stop connected with the driving member for limiting the rotary movement of the type carrier and setting the same with the types in printing position, said series of stops being arranged on a line intersecting the plane in which the axes of said driving and driven members are located.

8. In a typewriting machine, the combination, with a rotary type carrier, of mechanism for imparting rotary movement to said carrier comprising a gearing the driven member of which has a smaller radius than the driving member so that the angles through which the driving member is rotated are smaller than the corresponding angles through which the driven member is rotated, a stop connected with said driving member and located between the axes of said driving and driven members, and a series of key-controlled stops cooperating with said stop connected with the driving member for limiting the rotary movement of the type carrier and setting the same with the types in printing position, said series of stops being arranged on a line intersecting the plane in which the axes of said driving and driven members are located and being arranged in two groups located on either side of said plane.

9. In a typewriting machine, the combination, with a rotary type carrier, and a key lever mechanism, of mechanism for imparting rotary movement to said carrier comprising a gearing the driven member of which has a smaller radius than the driving member so that the angles through which the driving member is rotated are smaller than the corresponding angles through which the driven member is rotated, the axis of said driven member and type carrier being located between said key lever mechanism and the axis of said driving member, a stop connected with said driving member and located between the axes of said driving and driven members, and a series of key-controlled stops cooperating with said stop connected with the driving member for limiting the rotary movement of the type carrier and setting the same with the types in printing position, said series of stops being arranged on a line intersecting the plane in which the axes of said driving and driven members are located and being arranged in two groups located on either side of said plane.

10. In a typewriting machine, the combination, with a rotary type carrier, its stem, and a key lever mechanism, of mechanism for imparting rotary movement to said carrier comprising a pinion mounted coaxially of and connected with said stem, a toothed sector meshing with said pinion and having a radius larger than the radius of said pinion, the axis of said type carrier being located between said key lever mechanism and the axis of said sector, a stop connected with said sector and located between the axes of said pinion and sector, and a series of stops controlled by said key lever mechanisms and cooperating with said stop connected with said sector for limiting the rotary movement of said type carrier and setting the same with any one of the types in printing position, said series of stops being divided into two groups located on either side of said stem, and said series of stops being located on a line intersecting the plane in which the axes of said pinion and sector are located.

11. In a typewriting machine, the combination, with a rotary type carrier, of key-controlled mechanism for imparting rotary movement to said type carrier comprising a driving member mounted on a rockable shaft of polygonal cross-section, an electromagnet for imparting rotary movement to said type carrier having its armature secured to said rockable shaft, and mechanism controlling the operation of said type carrier having one of its members secured to said rockable shaft.

12. In a typewriting machine, the combination, with a rotary type carrier, of mechanism comprising an electromagnet for imparting rotary movement to said type carrier, a stop arm movable with said mechanism, key-controlled stops cooperating with said stop arm and adapted to arrest said type carrier with any one of its types in printing position, and a pawl and ratchet teeth, one of them movable with said mechanism for locking the mechanism in arrested position, said pawl being adapted to be thrown into locking engagement with said ratchet teeth by the magnetism of the electromagnet being energized.

13. In a typewriting machine, the combination, with a rotary type carrier, of key-controlled mechanism for imparting rotary movement to said type carrier comprising an electromagnet and its armature and key-controlled stops for arresting the type carrier in position with any of the types in printing position, and means for locking the type carrier in the said printing position comprising teeth mounted on the armature of said electromagnet and an automatically retracted pawl adapted to be moved by the magnetism of said electromagnet into locking engagement with said teeth.

14. In a typewriting machine, the combination, with a rotary type cylinder, of key-controlled mechanism for imparting rotary movement thereto comprising a rock shaft, a pair of spring-pressed arms separate from said mechanism and movable independently of each other and eccentrically engaging said rock shaft and adapted to return the same into median position, and stops fixed relatively to said arms and adapted for direct engagement therewith for determining the median positions of said arms.

15. In a typewriting machine, the combination with a rotary type carrier, of key-controlled mechanism for imparting rotary movement to said type carrier, a rock shaft, two pawls engaging said rock shaft and adapted to hold the same in median position, and means operative when rotary movement is imparted to said type carrier and inoperative at the end of the return movement of said type carrier for retracting either one of said pawls away from said rock shaft.

16. In a typewriting machine, the combination, with a rotary type carrier, of key-controlled mechanism for imparting rotary movement to said type carrier, a rock shaft, a pair of arms mounted on said rock shaft, pawls engaging said arms for holding said rock shaft in median position, and means operative when rotary movement is imparted to said type carrier and inoperative at the end of the return movement of said type carrier for retracting either one of said pawls away from its arm.

17. In a typewriting machine, the combination, with a rotary type carrier, its shaft, and the mounting for said shaft which is rockable for imparting printing movement to said type carrier, of key-controlled and electrically operated mechanisms for imparting rotary and printing movements to said type carrier, a stop member movable with the mechanism for imparting rotary movement to said type carrier, key-controlled stops cooperating with said stop member for arresting the type carrier in position with any one of the types in printing position, locking means for preventing printing movement of said type carrier, and a pawl movable with said stop member connected with said locking means and adapted to be acted upon by said stops for releasing said locking means.

18. In a typewriting machine, the combination, with a rotary type carrier, its shaft, and the mounting for said shaft which is rockable for imparting printing movement to said type carrier, of key-controlled and electrically operated mechanisms for imparting rotary and printing movements to said type carrier, and a rock shaft transmitting rotary movement to said type carrier, a member connected with said printing mechanism and movable in a direction for permitting printing, means for locking said member in position for preventing printing, and means connected with said mechanism for imparting rotary movement and carried by said rock shaft for releasing said member to permit printing.

19. In a typewriting machine, the combination, with a rotary type carrier, its shaft, and the mounting for said shaft which is rockable for imparting printing movement to said type carrier, of key-controlled and electrically operated mechanisms for imparting rotary and printing movements to said type carrier, such mechanism including a rock shaft transmitting rotary movement to said type carrier, a member connected with said printing mechanism and movable in a direction for permitting printing, a pawl for locking said member in position for preventing printing, and means for retracting said pawl so as to release said member and permit printing.

20. In a typewriting machine, the combination, with a rotary type carrier, its shaft, and the mounting for said shaft which is rockable for imparting printing movement to said type carrier, of key-controlled and electrically operated mechanisms for imparting rotary and printing movements to said type carrier, a rock shaft disposed eccentrically of the axis of said type carrier for transmitting rotary movement to said type carrier, an arm connected with said mounting, a member mounted and movable coaxially of said rock shaft and engaged by said arm for preventing printing movement of the type carrier, a pawl engaging said member and locking the same in position for preventing printing, and means for retracting said pawl so as to release said member and to permit printing.

21. A typewriting machine as claimed in claim 6, in which the device connected with the throwing mechanism has its portions engaging said pawls located different distances away from the pawls.

22. In a typewriting machine, the combination with a rotary type carrier, and a key lever mechanism, of mechanism for imparting rotary movement to said carrier comprising a gearing the driven member of which has a smaller radius than the driving member so that the angles through which the driving member is rotated are smaller than the corresponding angles through which the driven member is rotated, the axis of said driven member and type carrier being located between said key lever mechanism and the axis of said driving member, a stop connected with said driving member and located between the axes of said driving and driven members, and a series of key-controlled stops cooperating with said stop connected with the driving member for limiting the rotary movement of the type carrier and setting the same with the types in printing position, said series of stops being arranged on a line intersecting the plane in which the axes of said driving and driven members are located on either side of said plane.

23. In a typewriting machine, the combination, with a rotary type carrier, of mechanism for imparting rotary movement to said type carrier comprising a stop member movable with said type carrier and mechanism, key-controlled stops cooperating with said stop member and adapted to arrest said type carrier with any one of the types in printing position, and a pawl taking part in the rotary movement of said stop member and adapted to engage, at the end of the rotary movement, a portion of the said mechanism which is fixed relatively thereto for preventing rebounding of the stop member.

24. In a typewriting machine, the combination, with a rotary type carrier and its shaft, a disk secured to said shaft, means to impart printing movement to said shaft, and a notched setting member adapted to be engaged by said disk moving toward the platen for adjusting the same longitudinally of its axis, said setting member being mounted so as to be yieldable in the direction of motion of the said disk when the type carrier is moving to printing position.

OSKAR FISCHER.